March 16, 1954 F. R. W. WERNESKOG 2,672,177
APPARATUS FOR FORMING, CUTTING OFF, AND COLLECTING
STRAW MATERIAL INTO STRUCTURAL ELEMENTS CONSISTING
OF STRAW MATERIAL NETTED BETWEEN FACING ELEMENTS
Filed Aug. 21, 1951
7 Sheets-Sheet 2
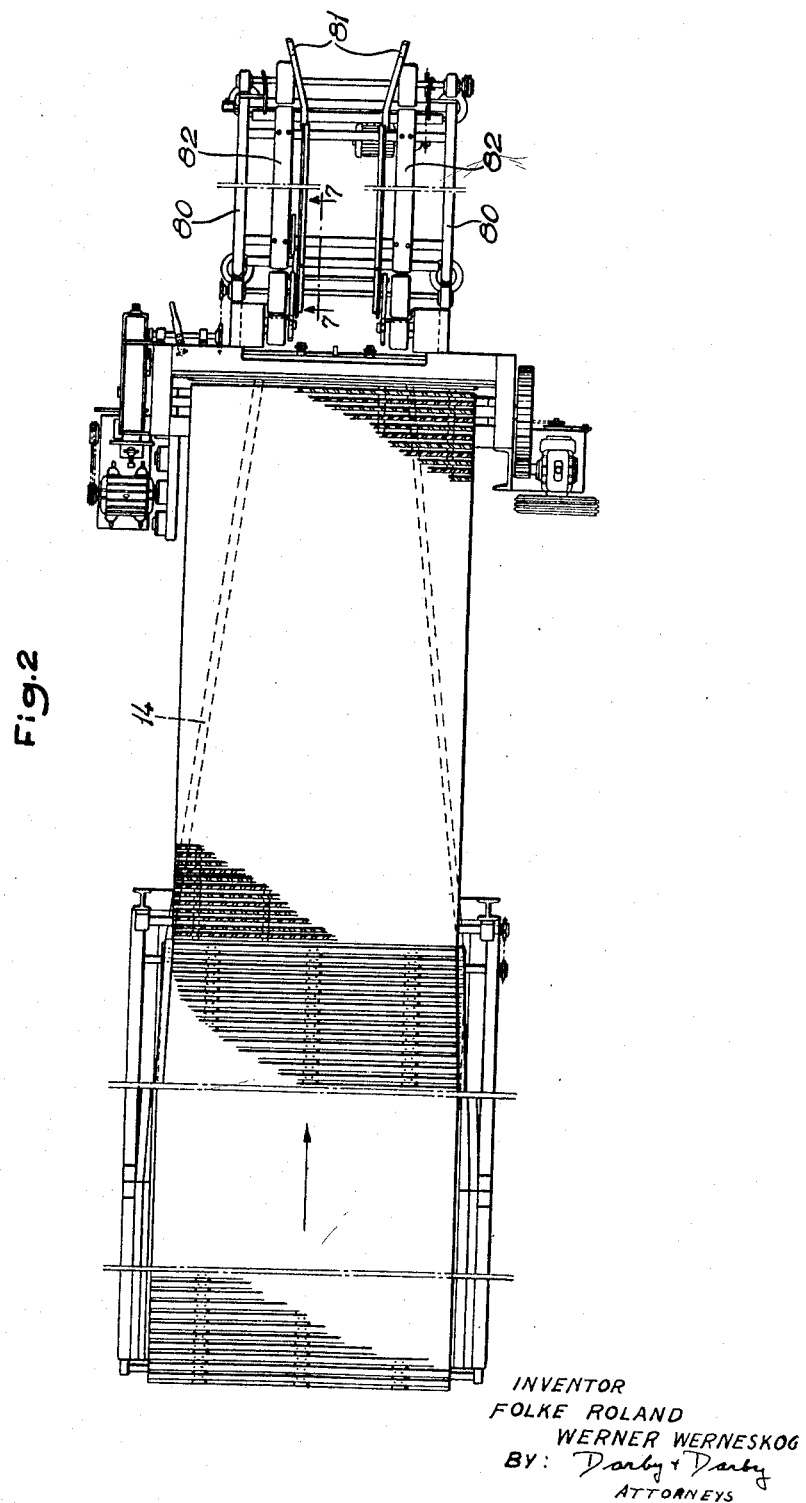
INVENTOR
FOLKE ROLAND
   WERNER WERNESKOG
BY: Darby & Darby
       ATTORNEYS

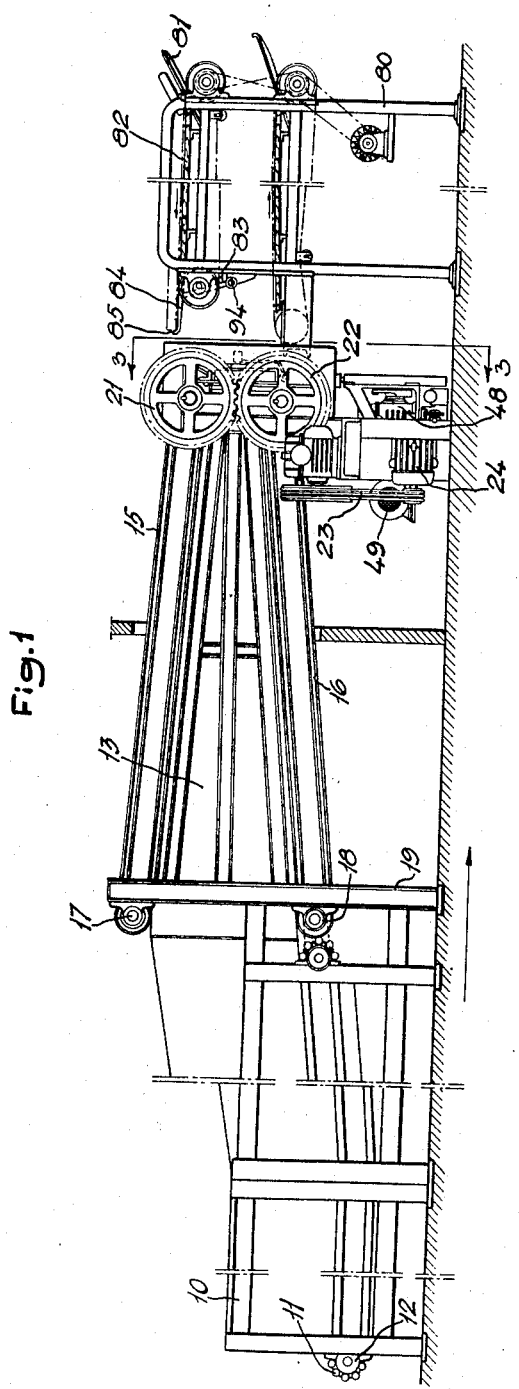

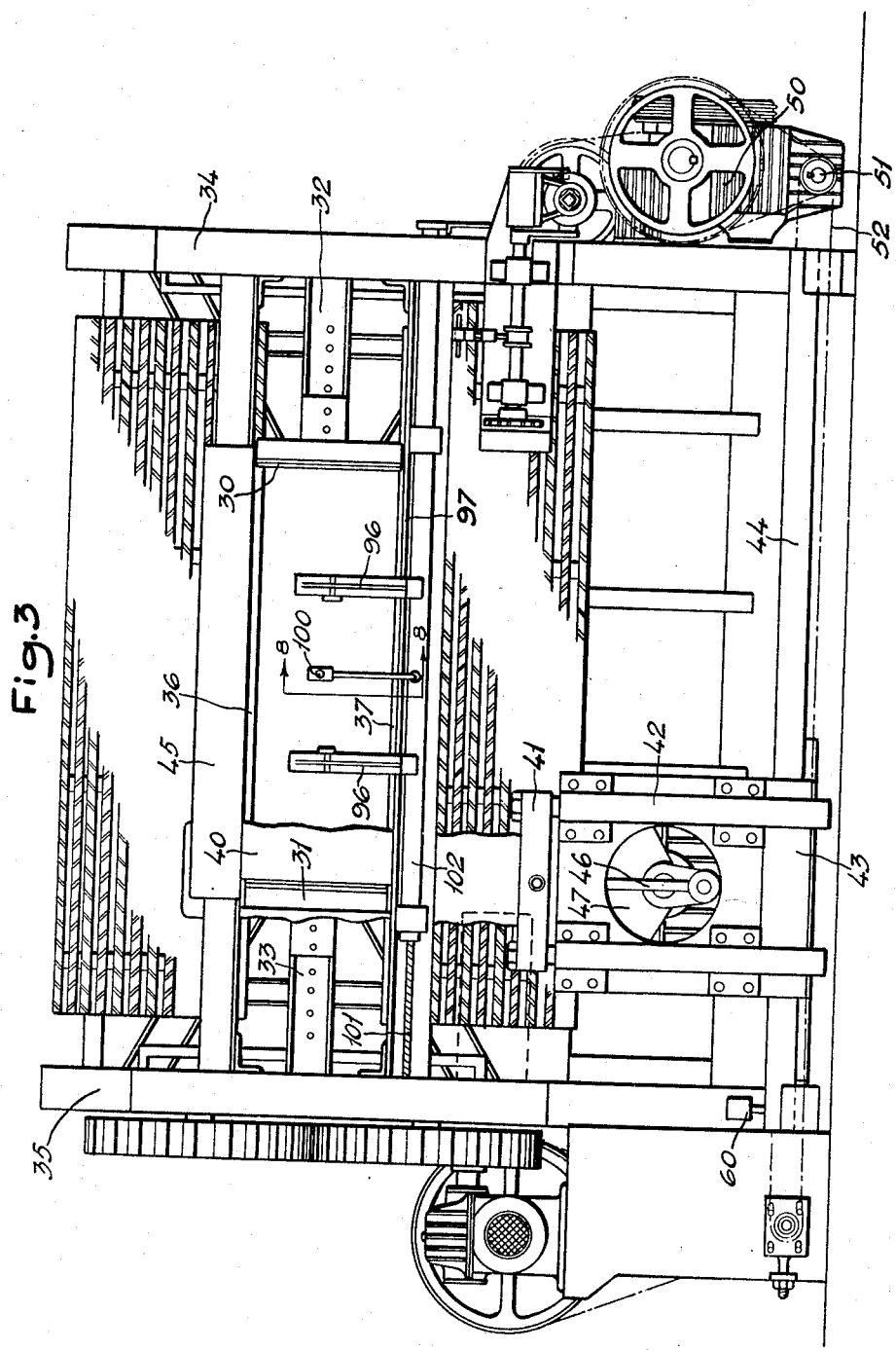

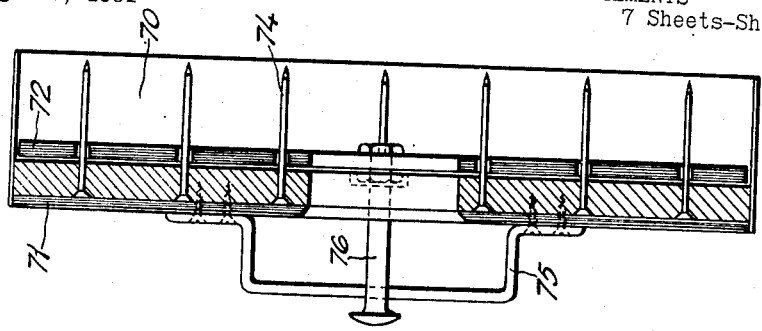
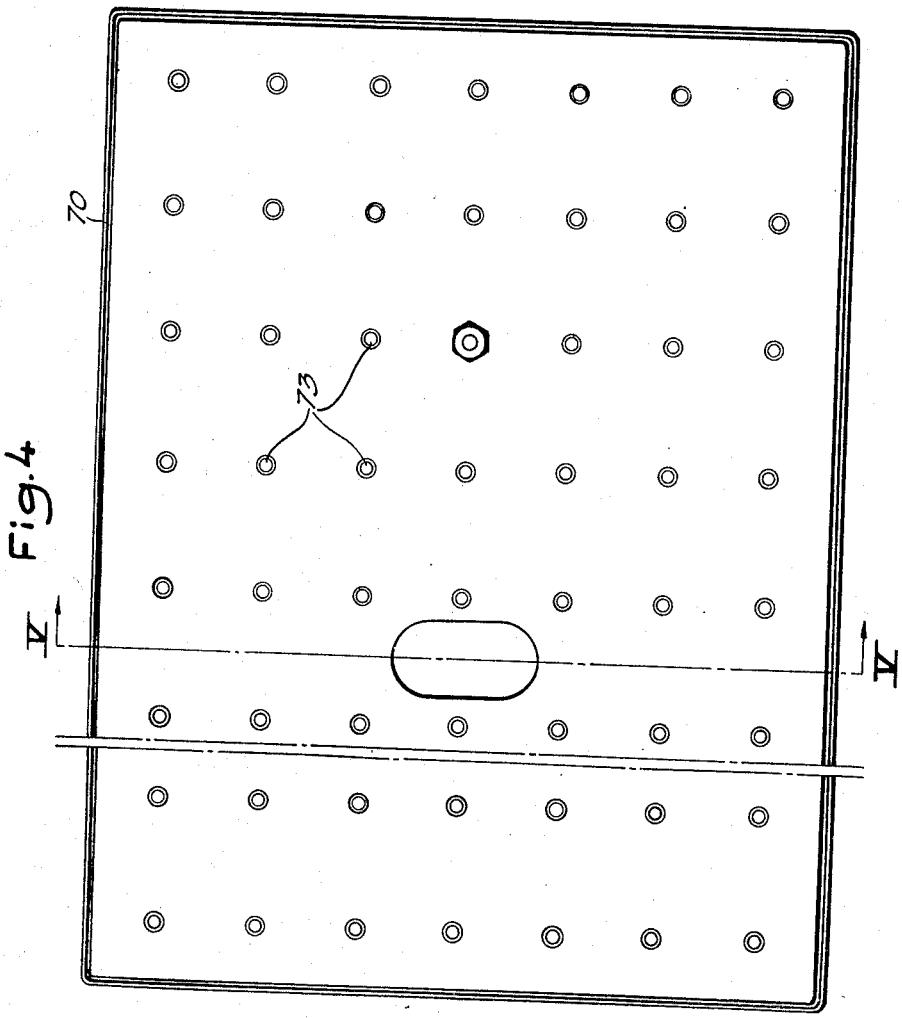

March 16, 1954  F. R. W. WERNESKOG  2,672,177
APPARATUS FOR FORMING, CUTTING OFF, AND COLLECTING
STRAW MATERIAL INTO STRUCTURAL ELEMENTS CONSISTING
OF STRAW MATERIAL NETTED BETWEEN FACING ELEMENTS
Filed Aug. 21, 1951
7 Sheets-Sheet 5
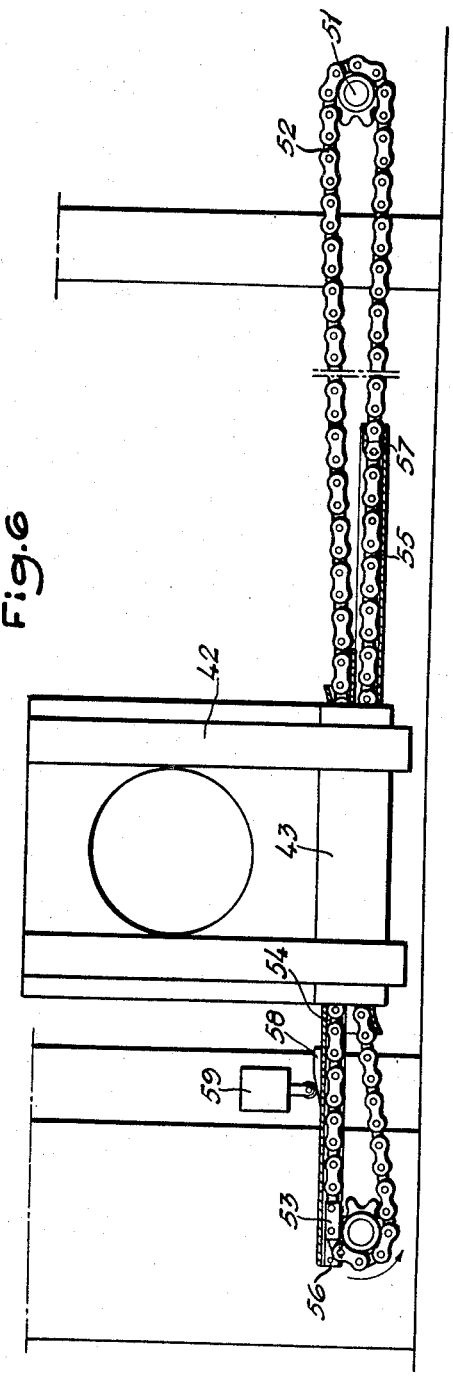
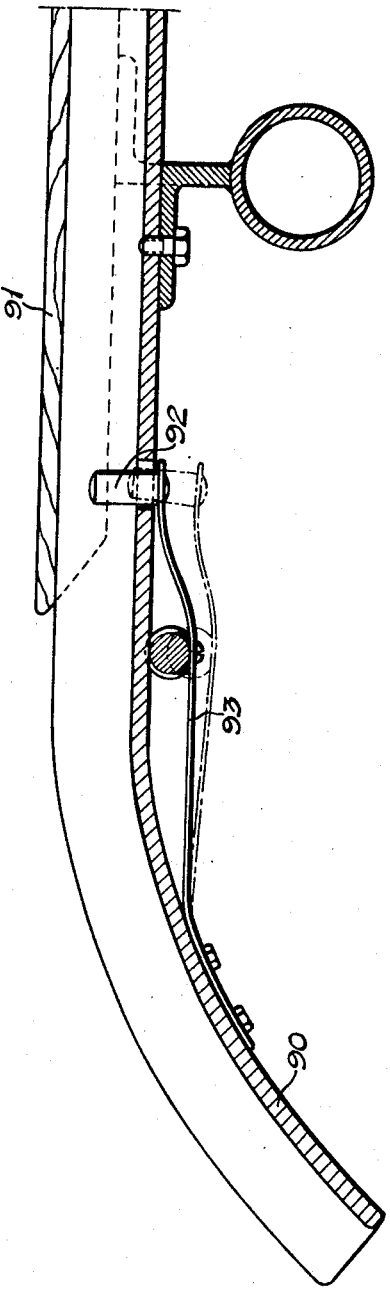
INVENTOR
FOLKE ROLAND
WERNER WERNESKOG
BY: Darby & Darby
ATTORNEYS

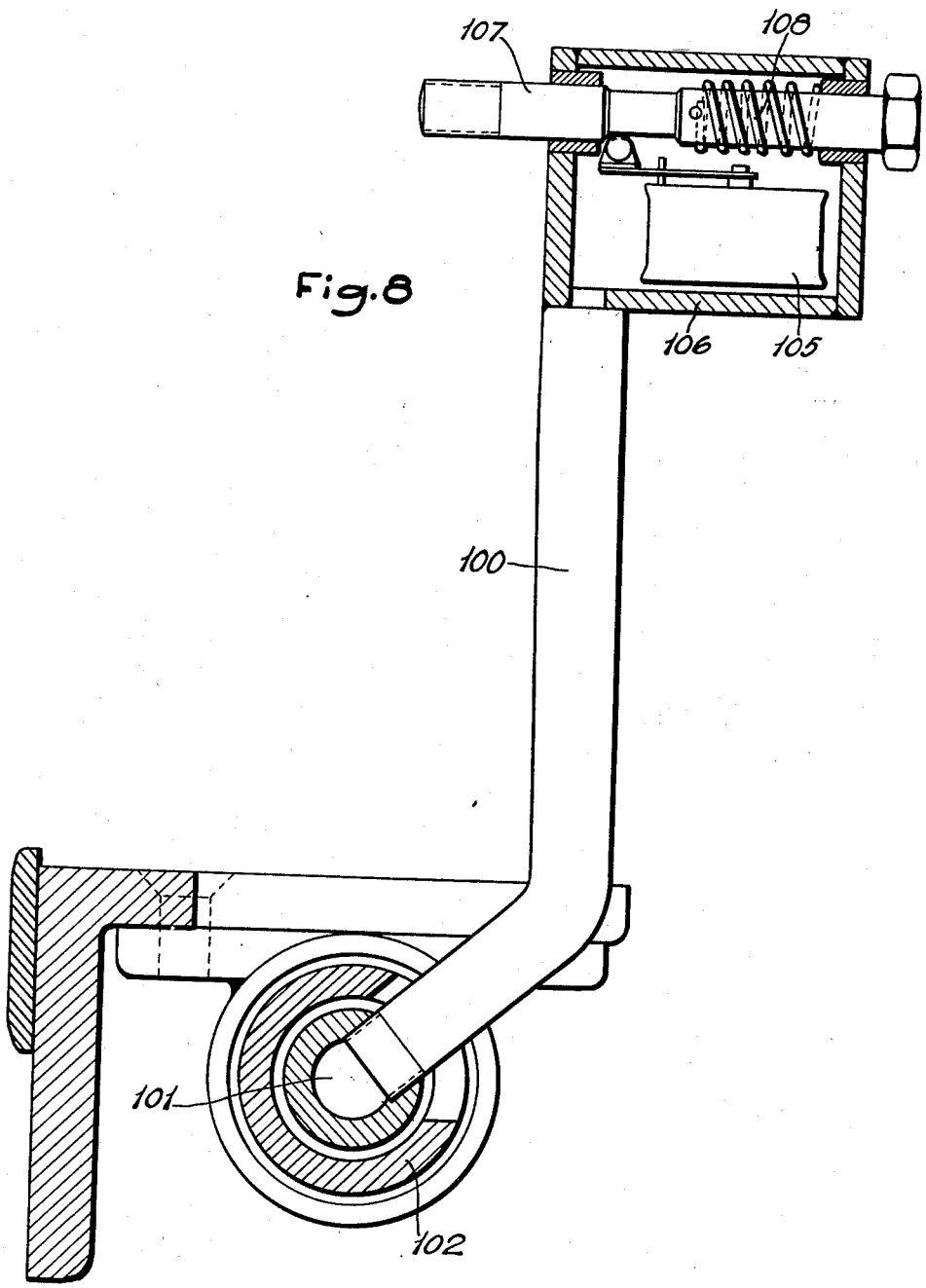

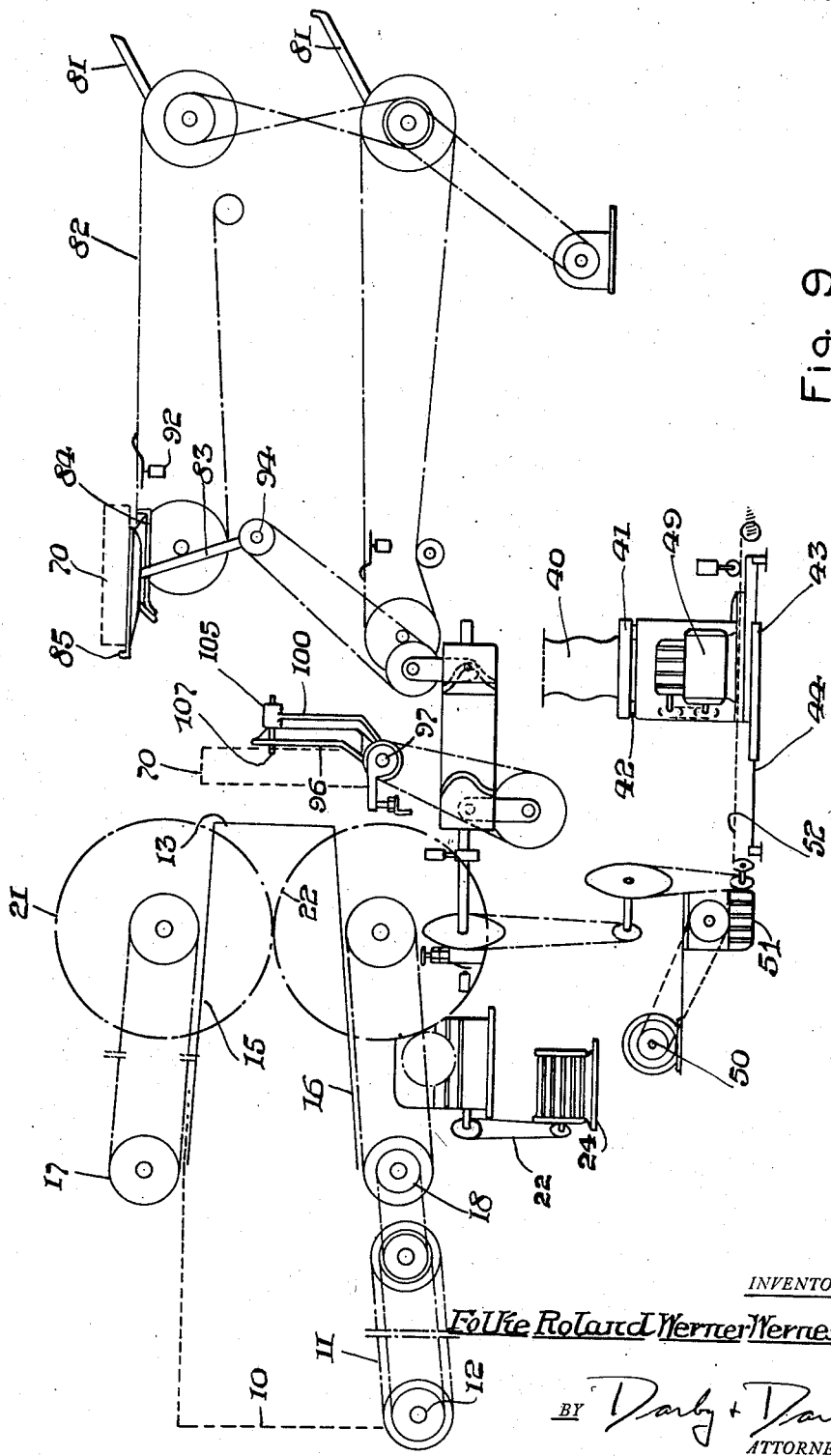

Patented Mar. 16, 1954

2,672,177

UNITED STATES PATENT OFFICE 2,672,177

APPARATUS FOR FORMING, CUTTING OFF, AND COLLECTING STRAW MATERIAL INTO STRUCTURAL ELEMENTS CONSISTING OF STRAW MATERIAL NETTED BETWEEN FACING ELEMENTS

Folke Roland Werner Werneskog, Forserum, Sweden

Application August 21, 1951, Serial No. 242,948

Claims priority, application Sweden May 24, 1947

15 Claims. (Cl. 154—1)

This invention relates to an apparatus for arranging straw material with the several straws essentially in parallel juxtaposition and collecting the straw material into a defined form for use in structural elements for walls, doors, floors and the like, the structural elements comprising covering or facing plates in spaced parallel relation having the straw material arranged between said plates as a filler, the separate stems of the straw material being substantially at right angles to the facing plates.

The present application is a continuation-in-part of my patent application Serial No. 789,132, filed December 1, 1947, now abandoned.

The formation of structural elements by the inclusion of a filler material between facing plates, such as plywood pieces, is a known practice and units which consist of vegetable fibrous material arranged in substantially perpendicular arrangement to the facing elements have been made. Though structurally this type of building unit has great utility, the means for forming the units quickly and conveniently have been lacking. Accordingly, it is a fundamental object of the instant invention to provide an apparatus useful in forming structural elements from such materials as vegetable fibers or stems, the apparatus being adapted to arrange stems in substantially parallel relation to each other, to measure off desired amounts and retain the desired units of material in the preferred orientation for mounting between facing plates.

It is another object of the invention to provide an apparatus which will receive a material such as straw continuously arranged, which, with the several fibers of straw substantially parallel, will compress the material and form it into an appropriate unit for severing to form the structural elements.

It is a further object of the invention to provide a device which will substantially continuously extrude straw fibers arranged parallel to each other into a form to a measured extent, sever the straw fibers and reset itself for the accomplishment of a succeeding cycle of straw extrusion.

It is a further object of the invention to provide a means for collecting straw or vegetable fibers or stems as extruded from a machine built in accordance with the invention.

Other objects and advantages of the invention will in part be obvious and in part appear hereinafter.

This invention accordingly comprises an apparatus including elements for receiving straw or vegetable stems, conveying devices for moving them forwardly and arranging the separate stems in substantially parallel relation, compressing the stems to desired dimensions and severing appropriate lengths thereof, together with means for receiving the severed lengths and passing them on to further operations. The invention accordingly is embodied in a machine having the features of construction, combinations of elements and arrangement of parts hereinafter to be described in greater detail.

The structure of the machine may be more readily understood by reference to the accompanying drawings in which:

Fig. 1 is a side elevation of the apparatus showing the general arrangement of parts wherein the path of travel and direction of orientation of vegetable fibers or stems or the like is indicated by the arrow.

Fig. 2 is a plan view of the apparatus corresponding to Fig. 1.

Fig. 3 is an end elevation of the apparatus taken along the line 3—3 in Figure 1 showing the discharge end through which vegetable stems are extruded for the purpose of subsequent severance into desired lengths for the building elements.

Fig. 4 is a plan view of a box for receiving endwise the extruded vegetable fibers from the machine.

Fig. 5 is a section through the box taken along the line 5—5 of Fig. 4.

Fig. 6 is a detailed showing of the part of the apparatus for imparting horizontal movement to the cut-off knife blade.

Fig. 7 is a detailed showing of the conveyor units (detailed view taken along the line 7—7 in Figure 2) employed for controlling the handling of boxes and their movement toward the discharge end of the apparatus to receive extruded fibers.

Fig. 8 is a detailed showing of the mechanism for automatically determining the length of the materials fed into the receiving box.

Figure 9 is an overall diagrammatic representation of the relationship of the several parts of the machine.

The building elements it is sought to produce consists of a pair of facing plates, which are preferably of an appropriate grade of plywood of such thickness as the ultimate use of the building element may appear to dictate. For light loads the facing plates may be light plywood. For extremely heavy loads heavier grades of plywood naturally are used. The unit itself consists of the facing plates of plywood, with the vegetable stems, for example, straw, as indicated in the present application, packed closely therebetween, the supporting stems of straw being arranged substantially perpendicular to the several face plates of the building element. Accordingly, the problem in forming the elements quickly and economically is one of taking straw which is usually in a heap in somewhat random arrangement of stems, feeding said straw into the machine which will receive it as fed and accomplish necessary re-arrangement of stems into substantially parallel relation, compress them to the desired degree, usually to about one-fourth their free volume, extrude them through a discharge opening of a predetermined cross sectional area into a form which will receive the compressed fibers and hold them in their compressed relation while a knife blade severs the desired length. Following this operation the form containing the severed oriented fibers is passed to subsequent handling where the facing elements are adhered thereto so that the completed unit consisting of facing elements with perpendicularly oriented straw fibers therebetween is obtained.

Referring, therefore, to the drawings, principally Figures 1 and 2, for the construction and general arrangement of the machine, 10 designates a channel into which straw fibers, preferably more or less arranged in parallel relation, are fed so that in the course of passage through the channel 10 the fibers are formed into a layer of essentially uniform thickness. The bottom of the channel consists of an endless conveyor belt 11, driven by rolls 12, and feeding the straw material into a compressing unit 13. It will be observed that the compressing unit 13 resembles essentially a hopper having a wide-mouth feed opening which narrows down to a smaller discharge opening. The compressing unit 13 constitutes essentially a continuation of the channel 10, but is arranged with converging sides so that compression of the fibers is accomplished as they pass through the drum. Thus the sides 14 (shown in Figure 2) are arranged to converge in the forward direction or the direction in which the vegetable fibers are fed. To provide for the continuous movement of the vegetable fibers, the top 15 and bottom 16 of the drum are formed as endless conveyor or compressor belts which converge towards the discharge opening of the drum, the belts 15 and 16 being carried by rollers 17 and 18 which are mounted in a principal supporting frame identified as 19.

At the discharge end of the said drum, gear wheels 21 and 22 which mesh with each other are located and are driven through transmission belt 23 by motor 24.

In Figure 3 the discharge opening or orifice is seen defined by vertical sides 30 and 31, carried by laterally adjustable supports 32 and 33, which in turn are mounted on vertical supports 34 and 35. The vertical sides of the discharge opening 30 and 31 are lined with a hard wearing strip and by means of the adjustable supports 32 and 33 are adapted to be displaced in the horizontal direction and to be locked in desired position, thereby to vary that dimension of the structural element. Similarly, the horizontal edges of the discharge opening 36 and 37 are of hard material and by adjustment of the position of the drive shafts carrying wheels 21 and 22 that dimension of the block to be formed can be varied. Generally, it is preferable to maintain the vertical dimension fixed and vary only the horizontal dimension of the discharge orifice.

For severing the desired lengths of extruded fibrous material, knife 40 is provided and mounted with a mechanism to make it move horizontally across the machine and simultaneously oscillate in a vertical plane so as to saw off the desired length of straw material. It is guided essentially adjacent to the wear strips 36 and 37, defining the vertical height of the discharge opening. To improve the efficiency of its cutting action, the knife 40 is provided with an undulatory cutting edge.

The structure best showing the knife may be seen in Figure 3 where the knife 40 is fixed in a holder 41 and is guided in its vertical movement by vertical guides 42 and in the horizontal direction by the carriage 43, which is displaceable along the horizontal guide 44. Restriction of the knife blade to the desired cutting plane at the face of the orifice is accomplished by the wearing guides 36 and 37 and the additional horizontal support 45.

Vertical movement of the knife is accomplished by means of a crank 46, carrying counter-weight 47, which crank is driven by a worm gear 48 (Fig. 1) which in turn is driven by motor 49. Horizontal movement of the knife is obtained by means of motor 50 which runs continuously and actuates a drive gear 51 which carries an endless chain 52 (Fig. 6).

The endless chain carries a driver 53 and travels in grooves 54 and 55 which form part of the carriage 43. Each of the latter grooves is provided at its outer end with shoulders 56 and 57.

Adjacent to the carriage, near the terminus of its horizontal movement and mounted on the vertical support 35 of the machine, is provided the limit switch 60, which functions to regulate the cycle of operation of the knife so that in a single horizontal pass the knife will oscillate vertically to accomplish the desired cutting.

The box 70 (Figures 4, 5) which is to be placed before the discharge opening of the machine is essentially an open box into which the straw material is fed endwise before the knife functions to cut it off. The box has a fixed bottom 72 in which there is a pattern of openings 73 through which needle-shaped members 74 project, as shown in the assembly in Figures 4 and 5. The needle-like members 74 reach substantially to the open face of the box through the openings in the displaceable bottom and are secured in the fixed bottom 71. The function of the needle members is to impale the straw fed endwise into the open box and support the material which has been pressed thereinto and cut off. On the exterior bottom face of the box handle 75 is placed near a central opening through which projects the member 76, secured to the displaceable bottom 72 of the box. It will be seen that when the material is impaled on the needle members it can be uniformly moved by operation of the displaceable bottom member with the member 76. Since the size of the discharge opening in the machine can be varied by altering the relative positions of the sides and conveyor belts, boxes of different dimensions may be used.

The structure for handling the boxes and receiving the extruded fibrous material is best shown in Figure 1. Briefly, it consists of a frame supporting several conveyor belts arranged so that the empty boxes are fed toward the straw as it is extruded and a second conveyor belt, beneath the first, on which a filled box is placed. Thus, the structure comprises a support 80 carrying inclined arms 81 secured to conveyor 82 which is arranged in front of the discharge opening of the machine. Endless conveying belts 82 receive empty boxes placed on the arms 81 and bring them to the discharge opening of the machine. Arranged near the front of the discharge opening of the machine is the guide arm 83 swingably mounted on the frame which carries a box holder 84 having an upwardly directed front lip 85, which serves to catch a box introduced into the holder by the belt. For guiding the box into accurate position in the holder the structure shown in Figure 7 is provided. It constitutes a pair of guide elements 90 which are located to receive the handle 75 of the box as it is moved into receiving position. The bottom of the box 71 itself slides along the guide 91 which parallels the conveyor belts. Only one box can be introduced into the holder at a time and this is regulated by means of the pin 92, spring-mounted at 93 in the supporting arm so that when the box is lowered into material-receiving position other boxes following it on the conveyor belt will be stopped. When the box carrier which is pivotally mounted about the shaft 94 has been rotated to move the box to a vertical or substantially vertical material-receiving position, the box is placed in position to be grasped by the holder 96 (Figure 3), which is pivoted on shaft 97, carried by the frame of the machine. This latter box holder brings the box close to the discharge opening of the machine, leaving just sufficient clearance for the knife blade 49 to pass between the discharge opening and the feed opening of the box.

For determining the length of the straw material fed into the box an arm 100 is mounted in parallel relation with the box holder arms 96 (shown in detail in Figure 8). The said arm 100 is mounted on a horizontal shaft 101 which is carried in the slotted hollow shaft 102. The shaft carrying the arm is mounted below the discharge opening of the machine. The arm 100 projects through the slot in the outer shaft, side openings being sufficiently large to permit the arm to swing within the outer shaft without having the latter rotate. The purpose of providing the hollow shaft is to permit introduction of electric wires from the feed motor to the arm, to limit switch 105, which is placed in casing 106 carried by the free end of the arm 100. The limit switch is operated by plunger 107 which is displaceable through the opening in the housing and is spring-mounted at 108.

The operation of the machine follows a logical sequence of steps. Feed motor 23 is in intermittent operation and is activated only momentarily to feed sufficient straw or fibrous material forward to substantially fill the hollow box which is in place. Straw material is placed in the feed section 10 and is carried forward by the conveyors 11 to the convergent compression section of the machine 13 where the required degree of compression is applied to the material following its orientation, and an appropriate amount of straw is fed out through the discharge opening. An open-faced box is set in position at the discharge opening and when straw has been fed thereinto to the depth of the box the plunger 107 on the micro switch is moved back, breaking the circuit of the feed motor and thereby stopping the forward movement of the feed.

Referring to Figures 3 and 6, for the mechanism by which the knife is operated in the cutting sequence of operations, it will be seen that the endless chain 52 is provided with a driver 53 and travels in grooves 54 and 55, each of which is provided with shoulders 56 and 57. With the chain moving in the direction indicated by the arrow, the driver 53 will press against the shoulders 56, fixed in the carriage 43 which will cause the carriage to be moved to the left as indicated in Figure 6, thereby carrying the knife and the guide back to the left. The operator permits the carriage to be moved such a distance that the knife will be carried idle past the discharge opening of the machine. At its extreme position to the left as shown in Figure 6 the shoulder 58 carried on chain 52 actuates limit switch 59, which in turn completes the circuit to the feed motor 23 so that straw feed is started and the material is fed into the empty box supported before the discharge opening of the machine. When it is fed into the box to the depth thereof, the straw material actuates piston 107 which in turn actuates the microswitch 105, thereby disconnecting the feed motor and completing the circuit to the motor 49. During this period of the feeding of the straw, the driver 53 is carried from its position at the extreme left of the carriage at 56 to the extreme right at 57, where the driver engages said shoulders and the carriage 19, together with the knife, which is oscillating in the vertical plane through actuation of the motor 49 by the limit switch 105, is brought to the right and the material is cut off. The box which is now filled is removed, the limit switch which has been actuated by the straw first stopping the vertical oscillations of the knife so that wear thereon is reduced. This cycle of operations of returning the carriage to the starting position, the feeding of straw into the box, actuating the knife to cut off the straw and providing time delay in vertical oscillation of the knife blade between the extremes of its position constitutes the cycle which is repeated at intervals as frequent as the operator on the machine can handle.

In summary, the operation of the machine is best understood by reference to Fig. 9, which constitutes a block diagram of the machine and the several motors. Thus, the machine has four motors, which can be operated in the desired sequence to perform the operations. Generally the group of motors is connected to the same power source and the control and limit switches described in the specification perform the necessary operations.

Thus, when the main switch controlling power to the machine is closed, the control feed conveyor can be started by means of its own control unit which causes its drive motor to operate. The next step in the operation is accomplished when sufficient straw has been fed into the container and the limit switch 107 functions to disconnect power from the drive motor. At this point also the switch controlling the drive motor for the knife blade closes the circuit thereto and the knife begins to oscillate in the vertical plane to cut off the straw. The motor controlling the knife carriage operates continuously and draws the knife across the front of the conveyor, and upon completion of this cycle the limit switch in that circuit disconnects power from the drive motor for the knife blade to interrupt the vertical oscillation. The drive motor for the carriage carries it back to its starting point, at which the limit switch is again operated, straw feed commenced again, and the cycle of operations performed over again.

It should be understood that the operation of the machine will call for having an operator attending the machine to control the feeding of boxes for receiving extruded straw as it passes through the discharge opening into the receiving orifice so that substantially continuous operation may be maintained.

Though the invention has been described with reference only to a single embodiment of the machine, it is to be understood that variation in details of construction may be carried out without departing from the spirit or scope thereof.

What is claimed is:

1. An apparatus for forming building elements characterized by being formed of face plates of substantially rigid material having fibrous vegetable matter arranged therebetween with the several fibers arranged substantially perpendicularly to the said face plates comprising, a feed channel for receiving and orienting the fibrous material in substantially parallel relation, a convergent section and a discharge section in series, means located at the discharge portion of the machine to receive discharged material and means arranged between the discharge opening and the receiving means for severing discharged material.

2. A device for forming building elements characterized by being formed with face plates having fibrous material oriented substantially perpendicularly thereto arranged between said plates comprising, a feed channel for receiving said material, a drum section for compressing said material in a direction perpendicular to the direction of orientation of the individual fibers, and discharge means for the compressed material in series, a box located at the discharge means for collecting discharged material and a knife mounted on the machine movable between the discharge means and the box for severing the discharged material.

3. In an apparatus in accordance with claim 2, a compressing drum characterized by having converging sides, the tops and bottom thereof being defined by continuous movable belts.

4. A device in accordance with claim 2 wherein the compression section is characterized by having endless belts defining the top and bottom thereof, said belts converging towards the discharge opening and side walls arranged between the endless belts, said side walls also converging towards the discharge opening.

5. An apparatus in accordance with claim 4 in which the vertical sides are adjustable relatively towards each other, and the top and bottom are adjustable relatively to each other.

6. An apparatus in accordance with claim 1, having an arm secured to a shaft, mounted in said machine adjacent to said discharge opening, said arm carrying a limit switch, activatable by material extruded from said opening, electrical connection from said switch to a feed motor controlled thereby, said shaft being mounted and formed to permit a limited degree of rotation thereof.

7. An apparatus in accordance with claim 1, in which the severing means is a knife arranged in a holder, which is displaceable in the horizontal direction across the discharge opening.

8. An apparatus for forming building elements characterized by being formed of face plates of substantially rigid material having fibrous vegetable matter arranged between said plates comprising, a feed section for receiving and orienting said material in substantially parallel relation, a compressing section for reducing the free volume of said material wherein it is compressed to a predetermined cross-sectional area, at most half of the free cross-sectional area of the feed section, the compression being in a direction perpendicular to the direction of orientation of the individual fibers, and discharge means for the compressed material, said feed, compression and discharge means being arranged in series, means for placing a box at the discharge means for collecting discharged material and a knife mounted on the machine movable between the discharge means and the box for severing the discharged material.

9. In an apparatus in accordance with claim 8 a knife carriage including a driving motor and an endless chain driven thereby, said chain being guided in two grooves in horizontal planes, a driving element secured to said chain and a pair of shoulders arranged on each of two extreme ends of the carriage to engage the driving means of the chain for a portion of its movement so that engagement of the driver with one of said shoulders brings the carriage to the starting point in the cycle and the other of said driving means carries said carriage across the face of the discharge opening.

10. In an apparatus in accordance with claim 9 control and driving means for producing vertically reciprocating movement of the said knife during its passage across the discharge opening of the machine.

11. In an apparatus in accordance with claim 9, a knife carriage having vertical and horizontal guides for defining the path of the knife across the discharge opening of the machine.

12. In an apparatus in accordance with claim 8, means for conveying empty boxes to the discharge means and for removing filled boxes from the said discharge means, comprising conveyors arranged before said discharge means and a pivotally mounted arm at said discharge means for receiving empty boxes, said conveyors serving to bring the empty boxes to said arm and to remove the filled boxes from said arm, said arm being pivotally mounted to receive a box conveyed in horizontal position and move it to vertical material receiving position at the discharge opening of the machine so that the severing means can cut off the straw material introduced into the box.

13. In a device in accordance with claim 12, a control means for regulating the amount of straw material fed into the box, comprising a pin perpendicularly connected to a limit switch which discontinues the feed into the box.

14. In an apparatus in accordance with claim 12, conveyor belts comprising units arranged in parallel spaced relation whereby handling means on the boxes are guided in the space between said parallel units.

15. A device for forming building elements of face plates having fibrous material oriented substantially perpendicularly thereto arranged between said plates, comprising a feed channel for receiving said material, a drum section for compressing said material in a direction perpendicular to the direction of orientation of the individual fibers and discharge means for the compressed material in series, and a knife mounted on the machine movable across the face of said discharge means for severing discharged material.

FOLKE ROLAND WERNER WERNESKOG.

References Cited in the file of this patent

UNITED STATES PATENTS

| Number | Name | Date |
|---|---|---|
| 638,461 | Houghton | Dec. 5, 1899 |
| 706,643 | Doppelmayr | Aug. 12, 1902 |
| 880,784 | Ferres | Mar. 3, 1908 |
| 2,369,006 | Banks | Feb. 6, 1945 |
| 2,370,705 | Anderson | Mar. 6, 1945 |

FOREIGN PATENTS

| Number | Country | Date |
|---|---|---|
| 559,527 | Great Britain | Feb. 23, 1944 |